US006047980A

United States Patent [19]

Margherita et al.

[11] Patent Number: 6,047,980

[45] Date of Patent: Apr. 11, 2000

[54] TWO-SPEED MANUAL WHEELCHAIR

[75] Inventors: Anthony Margherita, Chesterfield, Mo.; Amand Cousins, Seattle, Wash.; Rebecca A. Aleshire, Sylmar, Calif.; Khaled Al-A wadhi, Nuzh, Kuwait; Myke J. Woodwell, Seattle; Jean Livesay, Olympia, both of Wash.

[73] Assignee: University of Washington, Seattle, Wash.

[21] Appl. No.: 09/226,496

[22] Filed: Jan. 7, 1999

Related U.S. Application Data

[63] Continuation of application No. 09/099,647, Jun. 18, 1998, abandoned

[60] Provisional application No. 60/050,040, Jun. 18, 1997.

[51] Int. Cl.[7] ........ B62M 1/14

[52] U.S. Cl. ........ 280/250.1; 280/248; 280/249

[58] Field of Search ........ 280/249, 250, 280/250.1, 242.1, 247, 248

[56] References Cited

U.S. PATENT DOCUMENTS

| | | | |
|---|---|---|---|
| 3,563,568 | 2/1971 | Sasse et al. | 280/230 |
| 4,274,650 | 6/1981 | Gilles | 280/250.1 |
| 4,360,213 | 11/1982 | Rudwick et al. | 280/250.1 |
| 4,380,343 | 4/1983 | Lovell et al. | 280/250.1 |
| 4,453,729 | 6/1984 | Lucken | 280/242 |
| 4,506,900 | 3/1985 | Korosue | 280/242 |
| 4,506,901 | 3/1985 | Tosti | 280/242 |
| 4,560,181 | 12/1985 | Herron | 280/242 |
| 4,625,984 | 12/1986 | Kitrell | 280/250.1 |
| 4,652,026 | 3/1987 | Byrge | 280/242 |
| 4,682,783 | 7/1987 | Kuschall | 280/242 |
| 4,732,402 | 3/1988 | Lambert | 280/250.1 |
| 4,758,013 | 7/1988 | Agrillo | 280/250.1 |
| 5,020,815 | 6/1991 | Harris et al. | 280/246 |
| 5,033,993 | 7/1991 | Genaw et al. | 280/250.1 |
| 5,037,120 | 8/1991 | Parisi | 280/250.1 |
| 5,060,962 | 10/1991 | McWethy | 280/250.1 |
| 5,160,156 | 11/1992 | Mendon | 280/250.1 |
| 5,184,837 | 2/1993 | Alexander | 280/250.1 |
| 5,322,312 | 6/1994 | Cammack | 280/244 |
| 5,362,081 | 11/1994 | Beidler et al. | 280/250.1 |
| 5,482,305 | 1/1996 | Jeffries et al. | 280/250.1 |

FOREIGN PATENT DOCUMENTS

| | | | |
|---|---|---|---|
| 2615-100 | 11/1988 | France | 280/250.1 |
| 3110-687 | 1/1983 | Germany | 280/250.1 |

*Primary Examiner*—Daniel G. DePumpo
*Assistant Examiner*—David R. Dunn
*Attorney, Agent, or Firm*—Kathleen T. Petrich

[57] ABSTRACT

A manual two-speed wheelchair having a chair, frame, fixed wheel axles, and wheel assemblies. The wheelchair is capable of driving in a direct (1:1) power mode and a lower gear mode without shifting. A separate secondary input assembly provides for reduced gearing, one secondary input rim assembly per wheel assembly. The secondary input assembly includes a toothed driver gear, a toothed driven gear, and toothed belt. The driver gear and driven gear are offset from each other. This is accomplished by an offset arm. The secondary input assembly drives the driver gear, which, in turn, drives the belt, which, in turn, drives the driver gear, which is fixedly attached to the wheelchair wheel assembly. The wheel assembly also includes a direct drive input rim such that a user can choose to apply a propulsion force to either the direct drive input rim (1:1 direct drive mode) or the secondary rim assembly (the slow or reduced gear mode), which can be field adjusted by changing the gearing ratio between the driver gear, driven gear and belt.

7 Claims, 5 Drawing Sheets

FIG. 1
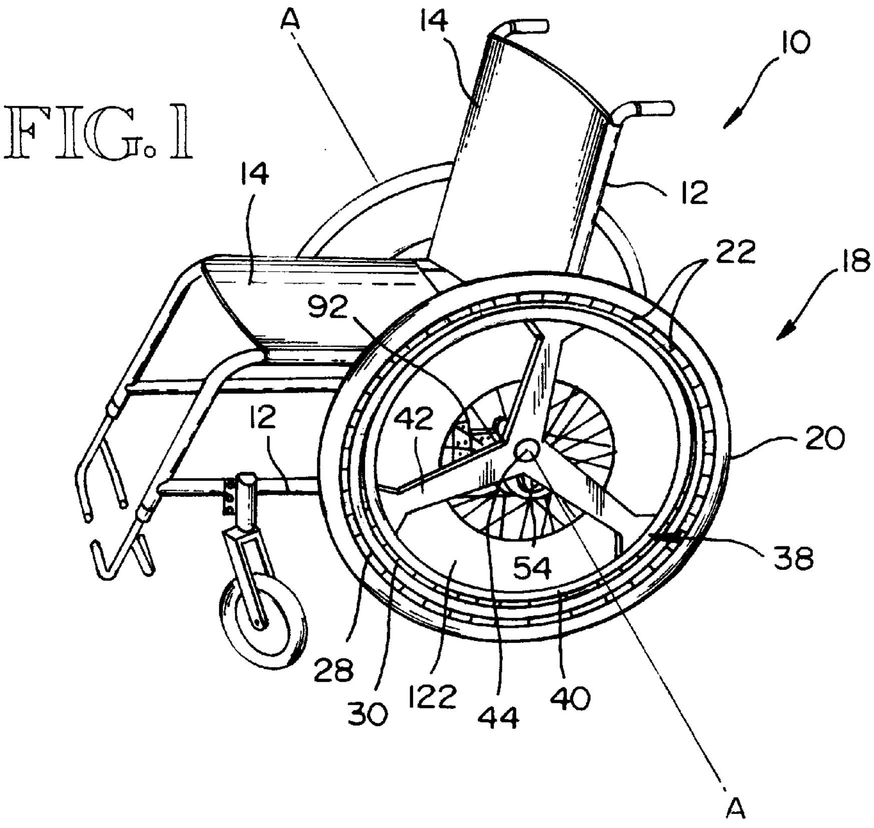
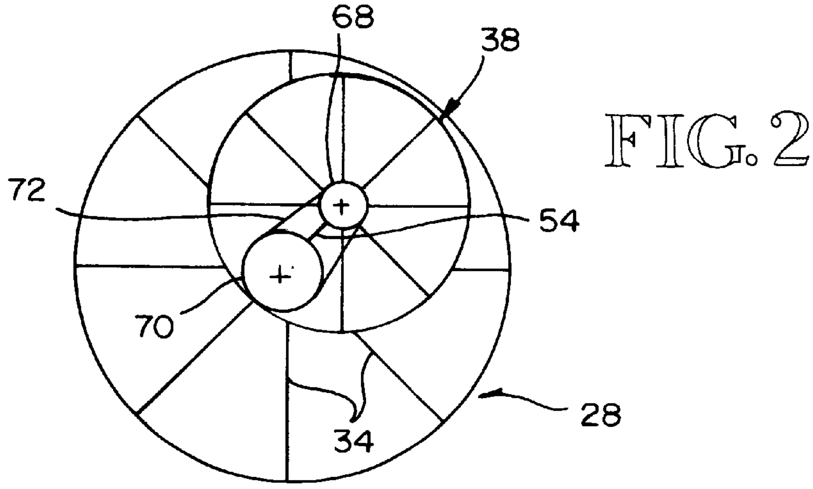
FIG. 2

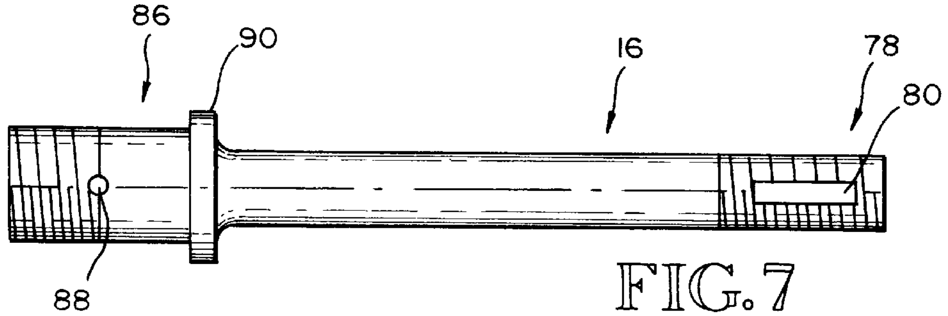
FIG. 7
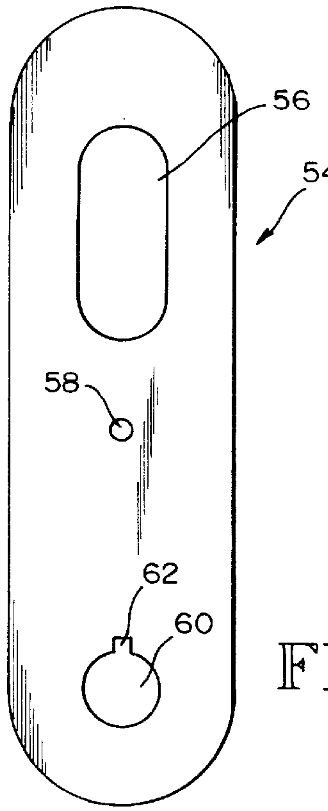
FIG. 8
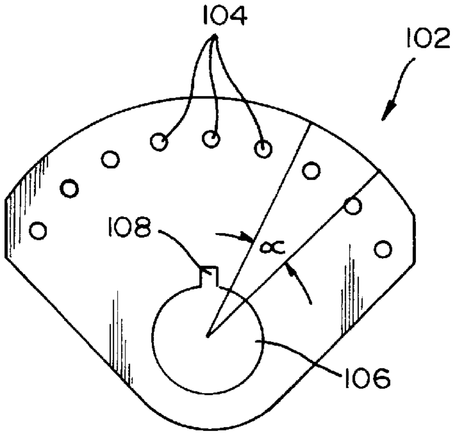
FIG. 9
FIG. 10
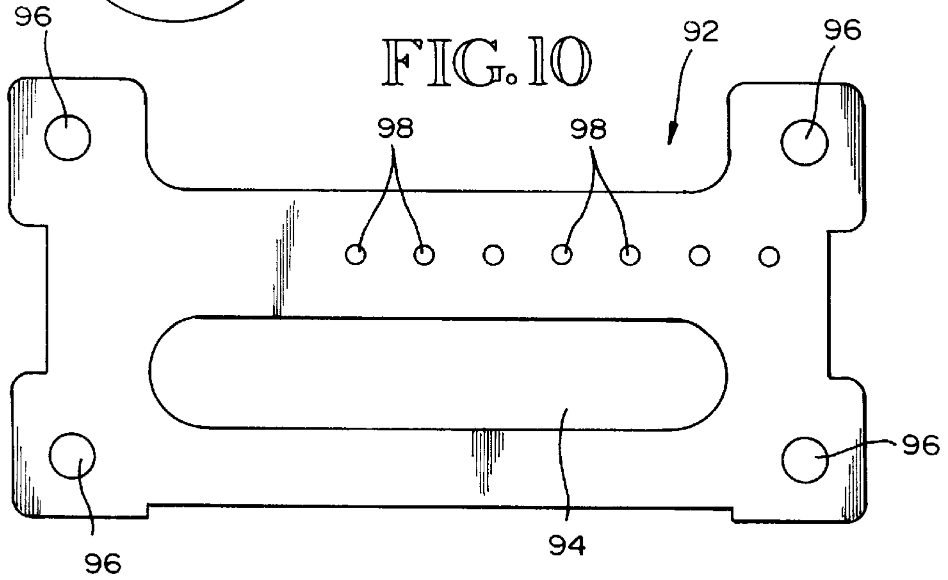

TWO-SPEED MANUAL WHEELCHAIR

RELATED APPLICATION

The present application is a continuing application of U.S. application Ser. No. 09/099,647, filed Jun. 18, 1998, and entitled "Two-Speed Manual Wheelchair," now abandoned, which claimed priority to U.S. Provisional Application Ser. No. 60/050,040, filed Jun. 18, 1997, and entitled "Two-Speed Manual Wheelchair."

TECHNICAL FIELD

The present invention relates to a two-speed manual wheelchair. More particularly, the present invention is related to a manual wheelchair having an input direct drive mode and a separate secondary input low gear drive, wherein the secondary input drive includes a pair of toothed gears and a toothed belt to reduce required propulsion force up to approximately 41% from that required in the normal direct drive mode.

BACKGROUND OF THE INVENTION

Individuals that are quadriplegic, paraplegic, or have suffered from some sort of a spinal cord injury typically rely on the use of a wheelchair to propel the user to a desired location. Some spinal cord injury patients might be inclined to choose an electric motorized wheelchair over a manual wheelchair for the minimal physical exertion required to operate such an electric wheelchair. However, motorized wheelchairs are expensive and require ramps and special vehicles to allow the wheelchair user greater mobility. That is because motorized wheelchairs are not easily folded for regular car travel. Additionally, electric wheelchairs require costly routine maintenance. Moreover, some physicians prefer to-prescribe manual wheelchairs because patients derive better cardiopulmonary effects from routine everyday use.

Manual wheelchairs are typically preferred by many wheelchair users because they are light weight, compact, low cost, and easy to use. However, many wheelchair users do not have sufficient upper body strength to traverse inclines and other rugged terrain using a standard manual wheelchair that has a 1:1 drive propulsion ratio. As such, many manual wheelchair users are limited in their scope of mobility.

Various attempts have been made to provide a two-speed or multi-speed manual wheelchair to allow users to "gear down" to a reduced gearing system such that the force required to propel the wheelchair in the lower gear is decreased. As such, even individuals with poor upper body strength may be able to maneuver a manual wheelchair on uneven terrain or inclines.

Such attempts have been made primarily through planetary gearing systems and manual lever arms. The planetary gear system, while most efficient, is mechanically complicated and can be quite expensive. The lever arm action is practical only for a small range of spinal cord injury levels due to the location of input levers. Also, the location of input lever arms compromises a user's ability to enter an exit with a wheelchair. Also, such lever arm action has a high degree of design complexity.

What is needed is a reduced cost, easily retrofit or easily manufactured, two-speed manual wheelchair that is easy to use, easy to maintain, and minimizes the overall chair width. Additionally, it is also preferred to be able to field adjust the force reduction ratio depending on a particular user's ability, such as during improvement in rehabilition or physical therapy, or a wheelchair that is used by more than one user.

DISCLOSURE OF THE INVENTION

The present invention relates to a manual shiftless two-speed wheelchair. The wheelchair can be easily propelled by a separate direct drive input in a normal (1:1) mode or in a lower secondary gear through a separate secondary input.

The wheelchair includes a frame, a chair supported by the frame, a pair of oppositely situated wheel axles and a pair of wheel assemblies. Each said wheel axle is fixedly connected to and extends outwardly from the frame. Each wheel assembly is mounted to its corresponding wheel axle, such that each wheel assembly is spaced apart with the frame and chair situated between the wheel assemblies. Each said wheel assembly includes a wheel, a centrally positioned hub, and at least one torque transferring support that interconnects the hub to the wheel. The hub defines an opening of a size and shape to receive one of the wheel axles. Each wheel assembly can freely rotate about its corresponding wheel axle. Both wheel assemblies are confined to rotate about its corresponding wheel axle such that when a user applies a propulsion force onto the wheel assembly, the wheelchair is propelled in the direction of the applied force.

The wheelchair also includes a pair of secondary input rim assemblies, one secondary input rim assembly to a corresponding wheel assembly. Each secondary rim assembly includes a secondary input rim and a centrally located input hub. An input axle shaft extends essentially perpendicularly from the input hub. The input axle shaft is offset from the wheel axle.

The secondary input rim assembly further includes a gear reducing assembly having a toothed driver gear connected to the input axle shaft. A toothed driven gear is connected to the hub of the wheel assembly. The input axle shaft drives the driver gear. In turn, the driver gear ultimately drives the driven gear, which is connected to the wheel hub. A user may apply a propulsion force to the secondary input rim to drive the wheel assembly in a reduced gear mode.

The reduced gear mode is determined by the particular size and number of teeth on the driven gear and the driver gear and in relation to the radius of the secondary input rim to the wheel radius. The present invention encompasses force reduction adjustability by changing gear ratios "in the field."

In preferred form, the at least one torque transferring support between the hub and the wheel is a plurality of cross laced spokes.

Also preferably, the wheelchair further includes a separate primary drive input rim positioned between the secondary input rim assembly and the wheel assembly. The primary drive input rim is fixedly attached to the wheel assembly such that the application of a propulsion force to the primary drive input rim directly drives the wheel assembly in the direct drive mode.

Also in preferred form, a rigid offset arm is used to offset the driver gear from the driven gear. The offset arm further includes an elongated slot such that the diameter of the driver gear and driven gear may be adjusted relative to the elongated slot. Additionally, a belt tension adjuster plate is further included that defines an opening through which the input axle shaft may be received. The belt tension adjuster plate further includes peripheral notches of a size to mate with a pin, which is mounted within the offset arm. The mating of the pin and belt tension adjuster plate periphery maintain the tension of the toothed belt in relationship to the driven gear and driver gear.

The present invention also provides for an adjustable axle plate that fixes its corresponding axle to the frame but still provides horizontal adjustability. The axle plate includes an elongated slot of a size to receive the axle such that the axle may be secured anywhere along the elongated slot and the periphery of the axle plate is fixedly attached to the frame.

The wheelchair of the present invention also includes a rotatable adjustment plate that is mounted proximal and adjacent the axle plate. The rotatable adjustment plate provides rotational adjustment of the input wheel assembly to match the user's range of motion. The adjustment plate further defines a plurality of radially spaced openings. These radially spaced openings correspond to openings on the axle plate. A connector connects an axle plate opening to a corresponding radially spaced opening on the rotatable adjustment plate to provide rotatable incremental adjustment of the wheel assembly relative to the frame.

In preferred form, the radially spaced openings on the rotatable adjustment plate are separated by 15 degrees. Also in preferred form, there are nine radially spaced openings on the rotatable adjustment plate such that the wheel assembly can be angularly adjusted 90 degrees forward or 30 degrees back from its initial state.

As the wheel axle cannot axially move during use, the wheel must be secured at the end which receives the secondary input rim assembly as well as the end that receives the axle plate. To that end, the axle may include a key or pin on each end to receive and abut a corresponding keyway. At the axle end which receives the hub and the secondary input assembly, a keyway is mounted on the offset arm to abut a key on the axle. At the other end, a keyway is positioned on the rotatable adjustment plate.

Additionally, there is also a keyed end on the input axle shaft that receives a corresponding keyway of the driver gear such that the input axle shaft and the driver gear lock together. When a force is applied to the secondary input rim, the input axle shaft drives the driver gear.

According to another aspect of the present invention, the invention may also include a shield that is positioned externally and adjacent the cross laced spokes of the wheel assembly in order to protect the user's fingers from entanglement within the cross laced spokes when moving between the secondary input rim and the direct drive input, whether through a direct drive input rim or through the wheel assemblies themselves.

The present invention also includes a method to retrofit an existing manual wheelchair, similar to that discussed above. Here, the method includes replacing both wheel axles and wheel assemblies. Next, the method provides a new wheel axle pair that is fixedly attached to the frame such that each axle cannot rotate relative to the frame. Next, a new pair of wheel assemblies is provided. Each wheel assembly includes a wheel, a centrally positioned hub, and at least one torque transferring support interconnecting the hub and the wheel. The hub defines an opening of a size and shape to receive one of the wheel axles such that the wheel assembly can freely rotate about its corresponding wheel axle.

Next, the method provides a pair of secondary input rim assemblies. Each secondary input rim assembly includes a secondary input rim and a centrally located input hub. An input axle shaft extends essentially perpendicularly from the hub and is offset from its corresponding wheel axle. The secondary input rim assembly further includes a gear reducing assembly having a toothed driver gear which is connected to the input axle shaft and toothed driven gear which is connected to the wheel hub. Each wheel assembly through its hub opening is mounted over its corresponding wheel axle. The secondary input rim assembly is mounted adjacent and external each wheel assembly such that the reduced gear assembly is mounted between the wheel assembly and the secondary input rim. The input axle shaft is connected and secured to the driver gear and the driven gear is connected to the hub of the wheel assembly.

The method also includes providing a toothed belt that engages a portion of the periphery of both the driven gear and the driver gear and wherein the driver gear is laterally offset from the driven gear by an offset arm that receives the wheel axle at one end and the input axle shaft at the other end.

The method may also include providing an elongated slot in the offset arm, similar to that discussed above, such that the gear ratio may be adjusted in the field. The method also includes providing a belt tension adjuster plate that is positioned externally of the offset arm and adjacent the elongated slot. The belt tension adjuster plate defines an opening through which the input axle shaft may be received and includes a periphery having notches of a size to receive a pin mounted within the offset arm such that the mating of the pin and a portion of the periphery of the belt tension adjuster plate maintains the tension of the toothed belt relative to the offset arm between the driven gear and the driver gear.

These and other advantages, objects, and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 is a perspective view of the two-speed wheelchair of the present invention disclosing a frame of a size to support a centrally located chair and with two oppositely situated wheel assemblies with one wheel assembly on each side of the wheelchair, and disclosing a primary drive input and a secondary input assembly including a gear reduction assembly per wheel assembly, both the primary drive input and secondary input assembly are external of its corresponding wheel assembly;

FIG. 2 is a schematic diagram of the secondary input assembly in relation to the primary drive input;

FIG. 7 is a top plan view of the axle;

FIG. 8 is a front view of the offset arm;

FIG. 9 is a front view of a rotatable adjustment plate that provides rotatable adjustment of the primary drive input relative to the fixed wheel axle; and FIG. 10 is a front view of the axle plate.

BEST MODE FOR CARRYING OUT THE INVENTION

The present invention relates to a manual wheelchair capable of being propelled forward or backwards in a standard direct drive mode or in a lower reduced gear mode. The present invention is designed to be either manufactured new or capable of retrofitting an existing standard manual wheelchair, yet still maintain simplicity of operation and minimize the overall chair width.

Figure 3:
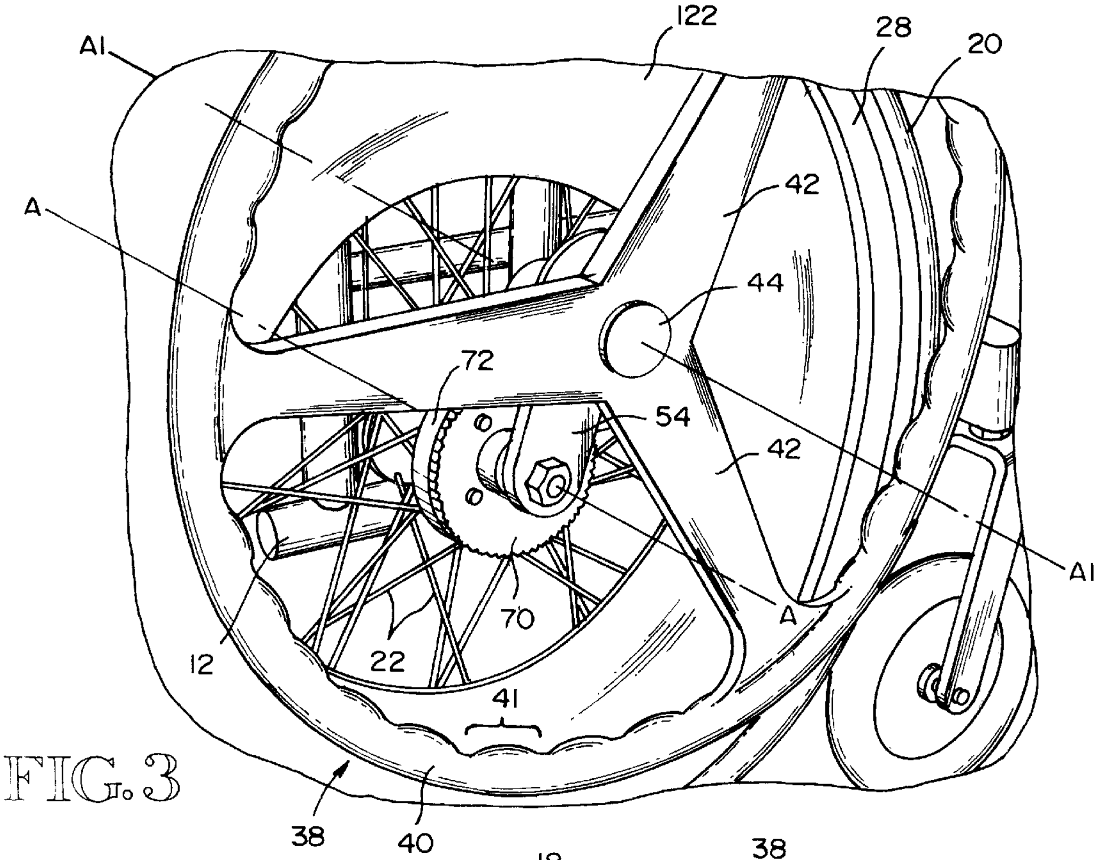
FIG. 3 is an enlarged view of that shown in FIG. 1 better disclosing the secondary input assembly including a secondary input rim with finger grips, a plurality of spokes, and an input hub, and a gear reducing assembly.
Figure 4:
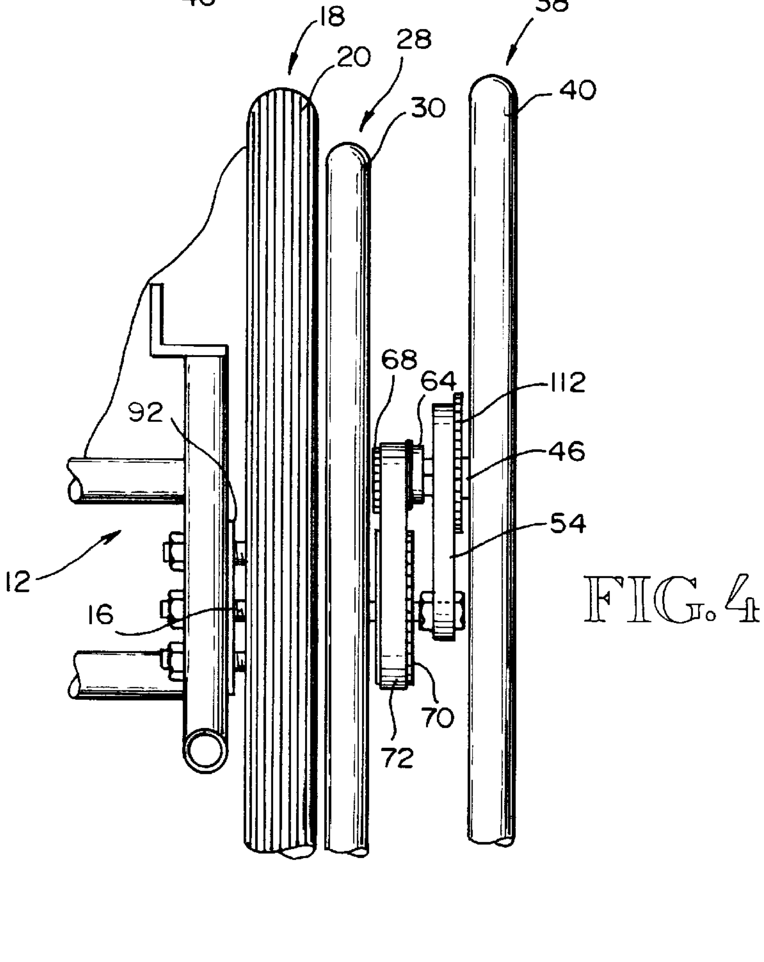
FIG. 4 is an end elevational view of FIG. 3 and better disclosing the relationship of the secondary input rim assembly relative to the primary drive input, the wheel assembly, the (wheel) hub, and the wheel axle.
Figure 5:
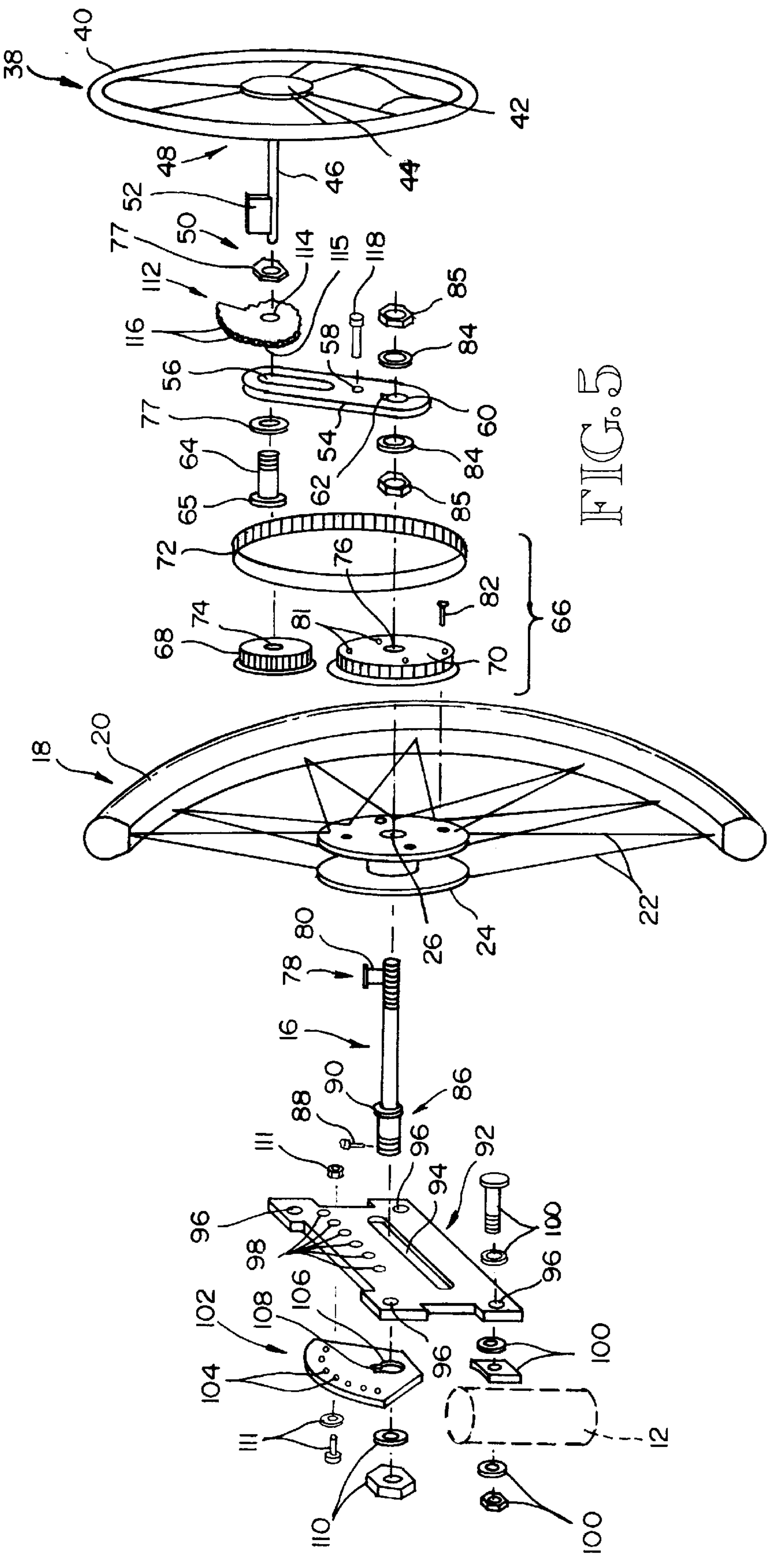
FIG. 5 is an exploded perspective view of the wheel assembly and secondary input assembly and shown less a separate primary drive input rim and finger shield.

Referring to FIGS. 1–5, the present invention is a manual wheelchair 10 having a frame 12 to support a chair 14 of which a user would sit. Extending essentially perpendicularly from each side of the frame is a wheel axle 16, which is best shown in FIG. 5. Unlike a standard manual wheelchair, each wheel axle 16 is fixed to frame 12 and is not allowed to freely rotate about a central axis A—A. Mounted on each axle is a wheel assembly 18 such that the chair and frame are positioned between two spaced apart and axially aligned wheel assemblies 18. Each wheel assembly 18 has its own independent axle so that both wheels are not affected by propulsion on one side or the other of the wheelchair.

Referring particularly to FIG. 5, each wheel assembly includes a wheel 20, a plurality of spokes 22, and a hub 24. Each hub 24 defines a centrally located opening of a size to receive an end of its corresponding axle 16. Here, the term "wheel" is broad enough to encompass a tire and tube, typically found on most wheelchair wheels. The term "hub" may also include a plurality of bearings (not shown) that allows the hub to freely rotate about the wheel axle without friction.

Unlike a standard wheelchair, spokes 22 must be capable of transferring torque. One way to do this is to cross lace the spokes. This is because the axle, being stationary, no longer rotates with the hub relative to the frame.

The present invention includes a direct (1:1) primary drive input, similar to a standard manual wheelchair. The primary drive input can either be the wheel assembly itself by applying a direct propulsion force to the wheel 20, or to a separate primary drive rim 30 (see FIG. 4), which is external, adjacent, and attached to its corresponding wheel assembly 18. Primary drive input rim 30 can be attached to hub 24 through a plurality of spokes or the tire rim through a plurality of short spokes (not shown). The primary drive rim 30 is a minimal lateral distance from the wheel assembly. The reason for this is to minimize overall wheelchair width.

Referring particularly to FIGS. 2, key to the present invention is a secondary input assembly 38 that is external of primary drive input 30. Here, secondary input assembly and the primary drive input are schematically shown. Secondary input assembly rotates about an axis A1—A1 that is offset from axle axis A—A. Secondary input assembly 38 includes a gear (force) reducing assembly such that the low gear is connected to axle 16. When a propulsion force is applied to the secondary input, the wheelchair will be propelled forward or backward (depending on the direction of the force application) with less force than that of the 1:1 direct drive input. The low gear mode will move the wheelchair appreciably slower (less distance covered) than that when in the direct drive mode. In this way, a user can apply a reduced force to the secondary input assembly on difficult or uneven terrain. If the user wishes to go at a normal speed, such as the chair is on flat even terrain, the user would typically apply the normal force to the larger primary input rim.

Referring particularly to FIGS. 3–5, the secondary input assembly 38 includes a secondary input rim 40, which is smaller in circumference than the primary drive input rim. The secondary input rim 40 may include finger grips 41 as shown in FIG. 3. This aids a user in gripping the handles and puts less strain on the upper body. A plurality of spokes 42 interconnect secondary input rim 40 to a centrally located input hub 44. Extending perpendicularly from input hub 40 is an input axle shaft 46 that has a first end 48 and a second end 50. First end 48 is press fit into input hub 44 of secondary input rim 40. At the second end of input axle 50 is a connector which will mate with a corresponding mating member on the driver gear 68, discussed more below.

Referring also to FIG. 8, to offset the input axle shaft 46 from wheel axle 16, a rigid offset arm 54 is positioned between secondary input assembly 38 and the primary drive input 28. At one end of offset arm 54 is an opening 56 to receive second end 50 of input axle shaft 46. Preferably opening 56 is an elongated slot whose function will be discussed further below. At the other end of offset arm is an opening 60 of a size to receive an end of wheel axle 16. Generally centrally of offset arm 54 may be an additional small opening 58 of a size to receive a pin which will be discussed further below.

Figure 6:
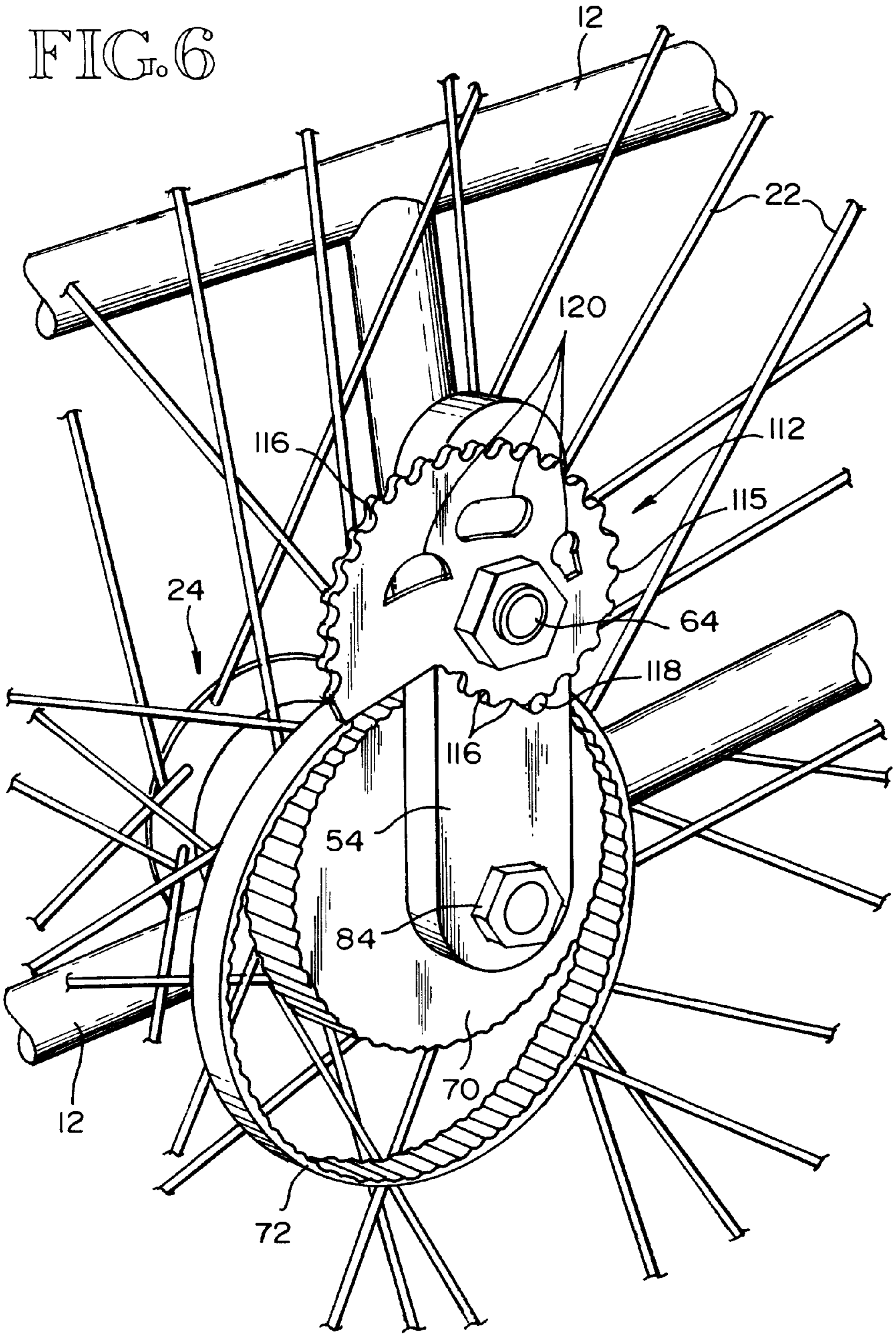
FIG. 6 is an enlarged pictorial view of the driven gear and tooth belt of the gear reducing assembly along with the belt tension adjuster and offset arm prior to engaging the secondary input rim and driver gear.

Now referring back to FIG. 5, and also to FIG. 6, key to the present invention is a gear reduction assembly 66. As discussed in the background of the invention, lever actions and planetary gear systems have not proven to be the least costly or easiest to operate. The present invention specifically uses a lightweight toothed driver gear 68 and larger toothed driven gear 70. A toothed belt encompasses both the toothed driver and the toothed driven gear. The driver gear defines a central opening 74. Driven gear 70 also defines a centrally located opening 76 that is of a size and shape to receive first end 78 of axle 16. Driven gear 70 is connected through a plurality of circumferentially spaced apart openings through a plurality of connectors 82 to wheel hub 24.

When fully assembled, input axle 46 extends through opening 56 of offset arm 54 and the opening 74 of driver gear 68. In preferred form, end 50 of input axle shaft 46 includes a key 52 that corresponds to a keyway on driver gear 68(not shown). The key is preferably a separate machined or molded piece that is affixed to-the input axle shaft after the axle is received through the keyway of the driver gear. The key is tensioned into the input axle shaft by two set screws (not shown). Thus, key 52 locks with the keyway on driver gear. When a propulsion force is applied to secondary input rim 40, the input axle shaft directly applies a torque to (or "drives") the driver gear.

The elongated slot receives a threaded receiver bushing 64, which defines an opening to receive an end of input axle shaft 46 prior to the input axle shaft locking with the driver gear 68. An Abutment 65 on one end of receiver bushing 64 is tensioned against the proximal side of offset arm 54 at the elongated slot 56. The receiver bushing is tensioned by a threaded jamb nut and spacer (collectively noted as 77) against elongated slot 56. A jamb nut is used over an ordinary nut as it is less wide. Both the jamb nut and spacer are shelf good items.

If both the receiving bushing and input shaft are made of hardened materials, over time the close tolerances causes shear failure of the surfaces. Although lubrication can be added (i.e. oil impregnated bronze material), the input axle shaft is preferably made from aluminum-bronze material. It is envisioned that lubrication is still necessary; however, the change to softer material reduces wear that can lead to shearing of the contacting surfaces.

As discussed above, the driver gear teeth do not directly engage the teeth of the driven gear. Rather, the driver gear teeth engage the teeth on the belt, which engages teeth on the driven gear to turn wheel hub 24 about axle 16. Thus, belt 72 becomes an integral part of the force reduction. To keep the tension constant on the belt, a belt tension adjuster 112 is used in combination with offset arm elongated slot 56 to apply the right tension to belt 72 and to keep the gear reducing assembly from slipping. To accomplish this, belt tension adjuster 112 is a disk having a scalloped or notched periphery 115 with notches or ridges 116. The belt tension adjustor 112 defines an opening 114 of a size to receive the input axle shaft 46. Because the force reduction can be varied by changing the belt/gear ratios, the offset arm opening 56 is an elongated slot to accommodate various center-to-center distances between the driver and driven gears. The following chart is illustrative of the various center lengths/and force ratios that can be used:

Input rim dia. (inches): 17.5
Tire diam. (inches): 24

| Overall Ratio | Pulley Ratio | Driver (#Teeth) | Belt (mm) | Ctr. Dist. (inches) |
|---|---|---|---|---|
| 0.41 | 0.30 | 18 | 375 | 3.28 |
| 0.50 | 0.37 | 22 | 375 | 3.12 |
| 0.55 | 0.40 | 24 | 375 | 3.04 |
| 0.64 | 0.47 | 28 | 375 | 2.88 |
| 0.69 | 0.50 | 30 | 400 | 3.31 |
| 0.73 | 0.53 | 32 | 400 | 3.23 |
| 0.82 | 0.60 | 36 | 400 | 3.06 |
| 0.87 | 0.63 | 38 | 425 | 3.48 |
| 0.91 | 0.67 | 40 | 425 | 3.39 |
| 0.96 | 0.70 | 42 | 425 | 3.30 |

The particular users size and physical upper body dexterity will determine what type of force reduction is needed for the present invention. The force ratio is determined by the radius of the hand rim and the tire radius. For example, an industry leader, the Quickie brand GPV wheelchair, has a hand rim radius of 10 inches and a tire radius of 12 inches (24 inch diameter), which has a force ratio of 10/12 or 0.83. Various gear ratios as outlined above can be used to change the force ratio.

To keep the tension of the belt constant once the correct center distance is determined, and the input axle shaft is inserted into the elongated slot of the offset arm and through the driver gear, a pin 118 is inserted into pin opening 58 of offset arm. Pin 118 mates with one ridge or notch 116 on belt tension adjuster 112. In this way, input axle shaft 46 is secured within slot 56 and the center distance between the driven gear 70 and driver gear 68 is correctly maintained.

Thus, a particular wheelchair can be modified for different users or an individual user can have the wheelchair field adjusted to the user's particular needs (e.g. after a debilitating injury, the force reduction required may be 64%, however after rehabilitation, the force reduction required may improve to 73%).

As wheel axle 16 and components that rotate relative to wheel axle 16 must not axially move during use, a keyway 62 is notched into axle shaft opening 60 so that a corresponding key 80 on a threaded first end 78 of axle 16 abut keyway 62. Key 80 may be like that of key 52. Also in assembled form, first end 78 of axle 16 is received through opening 26 of wheel hub 24, opening 76 of driven gear 70, and through opening 60 of offset arm 54. Key 80 of axle 16 abuts keyway 62 to lock offset arm 54 to axle 16 and to join and secure wheel assembly, primary input rim, and secondary input assembly. Retaining rings 84 and threaded jamb nuts 85 tension offset arm 54 to axle 16 ensure a tight connection between the axle and the offset arm.

Referring to FIG. 6, belt tension adjuster 112 may be spiral in shape and includes a plurality of scalloped ridges or notches to mate with a pin 118 that is received within opening 58 of offset arm 54. In this way, input axle 46 may be positioned to accommodate various gear ratios using the same offset arm. The mating of scalloped ridges or notches 116 and pin 118 keeps the tension on the belt and can be adjusted as needed. FIG. 6 shows the secondary input rim 40 and axle input axle 46 removed and less the driver gear. Belt tension adjuster 112 may also include a plurality of optional tool grabbing openings 120 to accommodate a variety of tools, such as those shown. In this manner, the overall force ratio may be reduced from one to one in the primary drive input ratio to anywhere from 0.41 to 0.96 depending on the gearing that is used.

Referring to axle 16, both in FIGS. 5 and 7, the end of axle opposite of first end 78 is designated as 86 and threaded like end 78. A pin 88 extends upwardly from end 86. Pin 88 may also be two pieces, similar to key 80 and key 52 and tensioned to the wheel axle by a pair of set screws through the axle (not shown). An abutment collar 90 is positioned adjacent second end 86 to allow a sufficient portion of the axle 16 to engage the wheel hub, the primary input hub, the driven gear 70 and offset arm 54. As shown in FIG. 7, the axle is machined to include a ⅛" radius rounded edge where the abutment collar abuts the wheel hub to reduce stress fracture.

Referring now to FIGS. 5 and FIGS. 7, 9, and 10, axle 16 must be fixed to frame 12 such that axle 16 cannot rotate about axis A—A. Hence, in a retrofit situation, the previous axle plate must be replaced with a new axle plate that fixedly connects the axle to the frame. Here, fixedly connected to axle can include (and preferably does) intervening members that ultimately fix axle 16 to frame 12.

A new axle plate 92 may be added to secure axle end 88 to frame 12. Axle plate 92 allows the axle end 88 to be offset from frame 12 such that axle plate has peripheral openings 96 that receive connectors 100 directly into frame 12. Preferably, there are four peripheral openings on axle plate 92 to secure the axle plate through connectors 100 to the frame. An elongated slot 94 receives axle end 88 which allows the user to horizontally adjust the wheel assemblies to the user's particular range of mobility. Additionally, axle plate 92 may further include a plurality of small holes 98 that will be discussed further below.

Additionally, the user can rotatably adjust the location of wheel assemblies through a rotatable adjustment plate 102.

The location of the input rim can be adjusted angularly in increments of 15 degrees. Adjustment plate 102 is a fan shaped disk with a plurality of radial spaced openings 104 that are spaced in 15 degree increments as shown in FIG. 9 at '. Adjustment plate 102 further defines an opening 106 of a size to receive end 86 of axle 16. Opening 106 further includes a keyway 108 such that pin 88 (on wheel axle 16) will abut keyway 108 and keep the axle secured through connectors 110 (i.e. washers and threaded jamb nut). If a user wishes to incrementally adjust the input rim relative to the frame, a pin connector assembly 111 can be placed in any one of the openings 104 relative to a corresponding axle plate opening 98 to provide a total possible rotational adjustment of 90 degrees forward or 30 degrees backwards from an at rest position.

In another embodiment, a finger shield 122 which is a flat disk, is provided to cover the spokes 22 of wheel assembly 18 between the spokes and the secondary input rim. This shield is often part of the traditional wheelchair to mitigate a user's fingers getting caught in the spokes.

Many of the components are shelf good items. A retrofit of an existing standard manual wheelchair can be easily accomplished as already discussed with a Quickie GPV chair. The belts may be high torque drive timing belts (also known as tooth belts) that are high stretch nylon with 30% fiberglass reinforcement plastic. The pulleys may be nylon with aluminum inserts. The belt tension adjuster may be like that found in motorcycles such as the Honda motorcycle part 40545-MNI-670 or 40544-MNI-670. The offset arm may be a 7075 T6 aluminum alloy, the axle may be a 4140 quenched and tempered aluminum. The axle plate may be a 7075 T6 aluminum alloy. The adjustment plate may be 6061 aluminum alloy. The axle plate may be 7075 aluminum, and the receiver bushing is preferably made of titanium. The secondary input rim is preferably made from aluminum man-made materials, such as injection molded plastic may be used, but flexure of the rim is to be avoided.

The overall width of the present invention in a retrofit was 28.5 inches. With this width, the user can still navigate tight door entrances and passageways. A Quickie brand GPV manual wheelchair before retrofit is approximately 23 inches.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A manual two-speed wheelchair comprising:

a frame;

a chair supported by the frame;

a pair of oppositely situated wheel axles, each said wheel axle being fixedly connected to the frame and extending outwardly from the frame;

a pair of wheel assemblies, each said wheel assembly including a wheel, a centrally positioned hub, and at least one torque transferring support interconnecting the hub to the wheel; said hub defining an opening of a size and shape to receive one of said wheel axles, wherein each said wheel assembly can freely rotate about its corresponding wheel axle, and wherein the wheel assemblies are spaced apart with the frame and chair positioned between the two spaced apart wheel assemblies, and wherein each wheel assembly is confined to rotate about its corresponding wheel axle such that when a user applies a propulsion force onto the wheel assembly, the wheelchair is propelled in the direction of the applied force in a direct drive mode;

a pair of secondary input rim assemblies, each secondary rim assembly to correspond with one said wheel axle, wherein each secondary input rim assembly is external and adjacent its corresponding wheel assembly; and each said secondary input rim assembly including a secondary input rim and a centrally located input hub, such that an input axle shaft extends essentially perpendicularly from the input hub and offset from the wheel axle;

said secondary input rim assembly further including a gear reducing assembly having a toothed driven gear connected to the hub, and a toothed belt, wherein the driver gear is offset from the driven gear such that when a propulsion force is applied to one of the secondary input rims, the corresponding input axle shaft drives its corresponding driver gear, which, in turn, drives the corresponding toothed belt, which, in turn, drives the corresponding driven gear, and which, in turn, drives the corresponding wheel assembly in a reduced gear mode; and a rigid offset arm to offset the driver gear from the driven gear;

wherein the offset arm further includes an elongated slot of a size to receive the input axle shaft, wherein the distance between the driver gear and driven gear is adjustable along the longitudinal length of the elongated slot, said offset arm also further includes another opening offset from the elongated slot, wherein the other opening is of a size to receive the wheel axle; and wherein the secondary input rim assembly further includes a belt tension adjuster plate positioned externally of the offset arm and adjacent said elongated slot of the offset arm, said belt tension adjuster plate defining an opening through which the input axle shaft may be received and includes peripheral notches, each said notch being of a size to mate with a pin connected to the offset arm, wherein the pin and belt tension adjuster plate maintain the tension of the toothed belt in relation to the driven gear and driver gear and the location of the input axle shaft in relation to the wheel axle.

2. The wheelchair according to claim 1, further comprising:

a receiver bushing defining a tubular opening of a size to receive the input axle shaft, said receiver is received through the elongated slot, said receiver bushing includes an abutment that biases the abutment of the receiver bushing against the offset arm.

3. A manual two-speed wheelchair comprising:

a frame;

a chair supported by the frame;

a pair of oppositely situated wheel axles, each said wheel axle being fixedly connected to the frame and extending outwardly from the frame;

a pair of wheel assemblies, each said wheel assembly including a wheel; said hub defining an opening of a size and shape to receive on of said wheel axles, wherein each said wheel assembly can freely rotate about its corresponding wheel axle, and wherein the wheel assemblies are spaced apart with the frame and chair positioned between the two spaced apart wheel assemblies, and wherein each wheel assembly is confined to rotate about its respective corresponding wheel axle such that when a user applies a propulsion force onto either wheel assembly or both wheel assemblies, the wheelchair is propelled in the direction of the applied force in a direct drive mode;

a pair of secondary input rim assemblies, each secondary rim assembly to correspond with one said wheel axle, where each secondary input rim assembly is external and adjacent its corresponding wheel assembly;

each said secondary input rim assembly including a secondary input rim and a centrally located input hub, such that an input axle shaft extends essentially perpendicularly from the input hub and offset from the wheel axle;

said secondary input rim assembly further including a gear reducing assembly having a toothed driver gear connected to the input axle shaft and a toothed driven gear connected to the hub, and a toothed belt, wherein the driver gear is offset from the driven gear such that when a propulsion force is applied to one of the secondary input rims, the corresponding input axle shaft drives its corresponding driver gear, which, in turn, drives the corresponding toothed belt, which, in turn, drives the corresponding driven gear, and which, in turn, drives the corresponding wheel assembly in a reduced gear mode;

an adjustable axle plate having an elongated slot of a size to receive the axle wherein the axle plate includes a periphery that is fixedly attached to the frame and the axle is secured to the axle plate anywhere within the elongated slot;

a rotatable adjustment plate being mounted proximal and adjacent the axle plate, wherein said adjustment plate further defines a plurality of radially spaced openings, and wherein the axle plate defines a plurality of openings corresponding to said radially spaced openings on the rotatable adjustment plate; and a connector in which one wheel assembly may be rotated incrementally and locked by the connector through one of said openings on the rotatable adjustment plate and its corresponding said opening on the axle plate to give the user a range of adjustability of the wheel assembly relative to the frame.

4. The wheelchair according to claim 3, wherein the radially spaced openings on the rotatable adjustment plate are separated by 15 degrees.

5. The wheelchair according to claim 4, wherein there are nine radial spaced openings on the rotatable adjustment plate such that the wheel assembly can be angularly adjusted 90 degrees forward or 30 degrees back from its initial state.

6. The wheelchair according to claim 1, wherein the wheel axle further includes a key on the end that receives the wheel hub, the driven gear, and the offset arm, and wherein the offset arm wheel axle opening further includes a corresponding keyway that locks with the axle key such that the wheel assembly, driver gear, and offset arm are confined to the wheel axle during use.

7. A method to retrofit an existing manual wheelchair having a frame to support a chair, a pair of oppositely situated wheel axles where each wheel axle is allowed to rotate relative to the frame and extends outwardly from the frame, and a pair of wheel assemblies wherein each wheel assembly includes a wheel, a centrally positioned hub, and a plurality of connectors connecting the hub to the wheel such that the wheel assembly axle can rotate about an axis relative to the frame, the retrofit having both a direct drive mode and a low gear mode, the method comprising:

removing both wheel axles and wheel assemblies;

providing a new wheel axle pair fixedly attached to the frame such that each axle cannot rotate relative to the frame;

providing a new pair of wheel assemblies, wherein each said wheel assembly includes a wheel, a centrally positioned hub, and at least one torque transferring support interconnecting the hub and the wheel, said hub defining an opening of a size and shape to receive one of the wheel axles, wherein each said wheel assembly can freely rotate about its corresponding wheel axle;

providing a pair of secondary input rim assemblies, wherein each said secondary input rim assembly includes a secondary input rim and a centrally located input hub, and an input axle shaft that extends essentially perpendicular from the hub, which is offset from its corresponding wheel axle, said secondary input rim assembly further includes a gear reducing assembly having a toothed driver gear, which is connected to the input axle shaft, and toothed driven gear, which is connected to the wheel hub;

wherein the method further provides a toothed belt that engages a portion of the periphery of both the driven gear and the driver gear and wherein the driver gear is laterally offset from the driven gear by an offset arm, which receives the wheel axle at one end and the input axle shaft at the other end;

mounting each wheel assembly through the hub opening over its corresponding wheel axle;

mounting the secondary input rim assembly adjacent and external of each wheel assembly such that the reduced gear assembly is mounted between the wheel assembly and the secondary input rim, wherein the input axle shaft is connected to the driver gear and the tooth driven gear is connected to the hub; and wherein the offset arm further includes an elongated slot wherein the distance between the driver gear and the driven gear is adjustable along the longitudinal length of the elongated slot, and wherein the secondary input assembly further includes a belt tension adjuster plate that is positioned externally of the offset arm and adjacent the elongated slot of the offset arm, wherein said belt tension adjuster plate defines an opening through which the input axle shaft may be received and the belt tension adjuster includes a periphery having notches of a size to receive a pin mounted within the offset arm such that the mating of the pin and the peripheral notch maintains the tension of the toothed belt in relation to the driven gear and the driver gear.

* * * * *